Aug. 22, 1939.     O. H. BANKER     2,170,649
VARIABLE SPEED TRANSMISSION
Filed Aug. 2, 1934     2 Sheets-Sheet 2
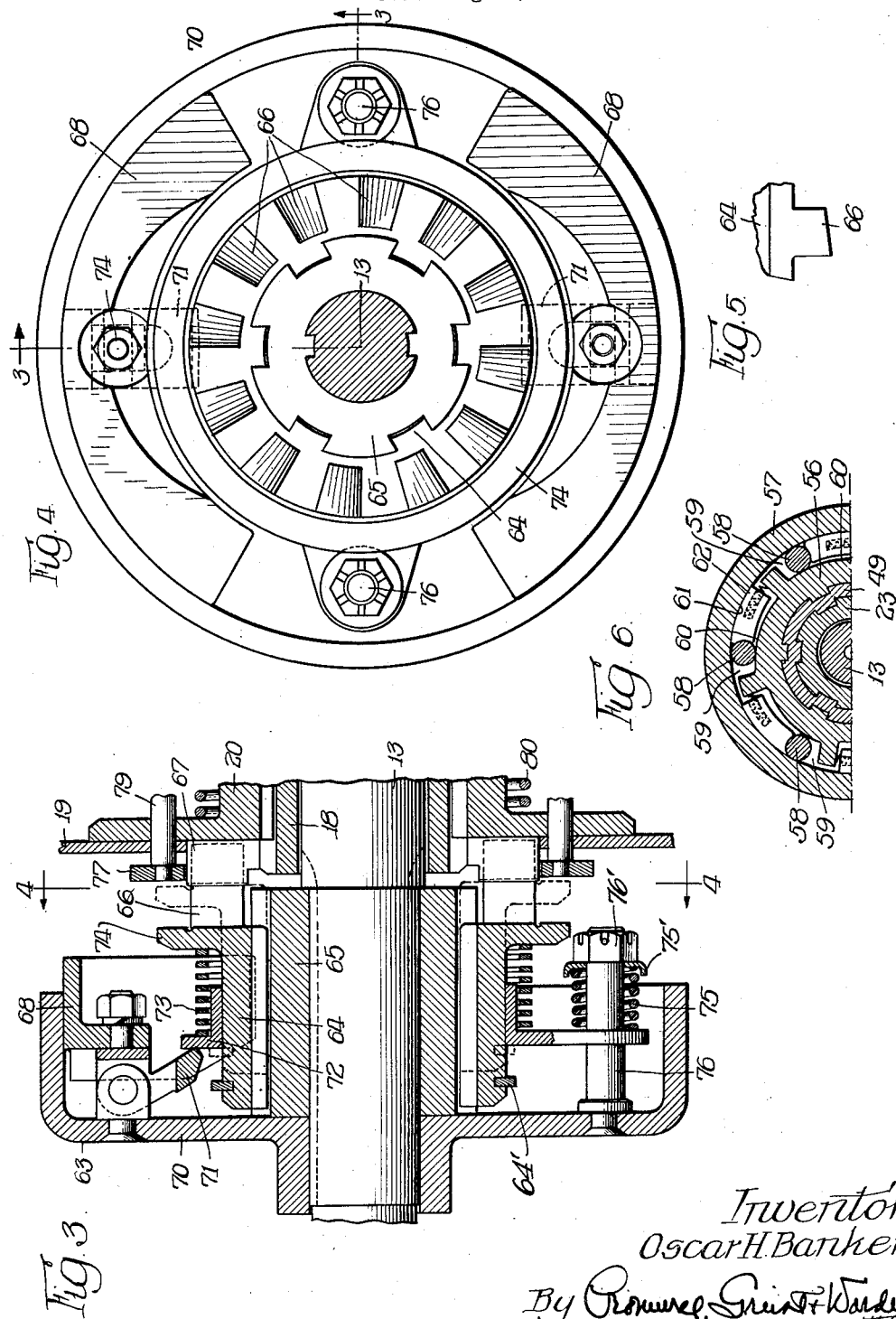
Inventor:
Oscar H. Banker,
By Cromwell, Greist & Warden
attys.

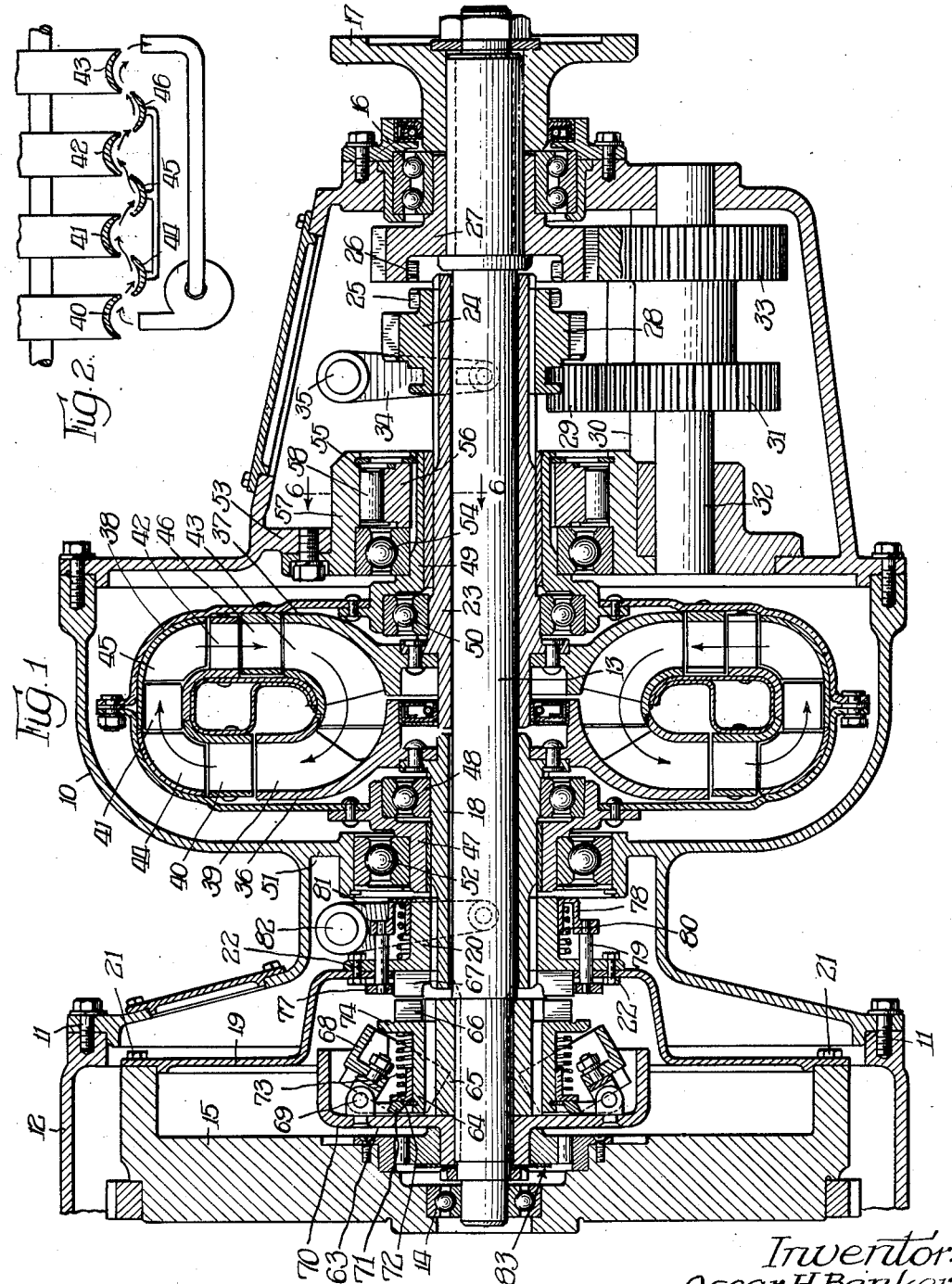

Patented Aug. 22, 1939

2,170,649

UNITED STATES PATENT OFFICE 2,170,649

VARIABLE SPEED TRANSMISSION

Oscar H. Banker, Chicago, Ill., assignor to New Products Corporation, Chicago, Ill., a corporation of Delaware Application August 2, 1934, Serial No. 738,127

5 Claims. (Cl. 192—48)

This invention has to do with variable speed transmissions, for use in automobiles, trucks, buses, railway cars and other places where a muliplication of torque is required in starting or in overcoming increased resistance, and is particularly concerned with a transmission of novel design in which the velocity of a rapidly circulating liquid is employed as the means for bringing the driven shaft up to a speed where it can be handled efficiently by the driving shaft in a direct drive without further multiplication of torque.

The purpose of the invention is to provide an improved transmission of the character described in which the driven shaft, when caused by the action of the liquid system to be brought up to the speed at which a direct drive can properly be undertaken, will become automatically coupled up with the driving shaft in a positive one-to-one ratio upon a momentary deceleration of the driving shaft.

While the foregoing statement is indicative in a general way of the nature of the invention, other more specific objects and advantages will be apparent to those skilled in the art upon a full understanding of the construction, arrangement and operation of the new transmission.

A preferred embodiment of the invention is presented herein by way of exemplification, but it will of course be appreciated that the invention may be incorporated in other structurally modified forms coming equally within the scope of the appended claims.

In the accompanying drawings:

Fig. 1 is a vertical longitudinal section through a transmission constructed in accordance with the invention;

Fig. 2 is a schematic view illustrating the principle on which the hydraulic torque converter in the transmission operates.

Fig. 3 is a fragmentary section through the direct-drive clutch in the transmission, taken on the right angular line 3—3 of Fig. 4, showing the clutch in full lines energized but still disengaged owing to a difference in the speeds of the driving and driven shafts, and showing the clutch in dotted lines fully engaged;

Fig. 4 is a section through the transmission at the location of the direct-drive clutch, taken on the line 4—4 of Fig. 3;

Fig. 5 is a detail view of one of the teeth of the clutch; and

Fig. 6 is a section through the transmission at the location of the overrunning brake, taken on the line 6—6 of Fig. 1.

The transmission which is shown in the drawings is enclosed within a casing 10 which is attached by bolts 11 to the rear end of the crank case 12 of an internal combustion engine. A shaft 13—which is the driven shaft of the transmission—extends the full length of the casing 10, with its front end journaled in bearings 14 in a bore in the center of the fly wheel 15 of the engine, and with its other end journaled in bearings 16 in the rear end of the casing. The shaft 13 terminates beyond the rear end of the casing in a coupling flange 17.

A tubular shaft 18—which is the driving shaft of the transmission—is journaled on the shaft 13 near the front end of the latter and is connected to the fly wheel 15 by means of a plate 19 and a collar 20. The outer edge of the plate 19 is attached by bolts 21 to the rim of the fly wheel 15, while the inner edge of the plate is attached by bolts 22 to a flange on the collar 20. The collar 20 is splined on the front end of the shaft 18.

Another tubular shaft 23 is journaled on the driven shaft 13 back of the driving shaft 18 and is provided at its rear end with an axially shiftable but non-rotatable collar 24. When the collar 24 is shifted rearwardly, a set of outwardly projecting clutch teeth 25 on the rear end of the same will move into circumferentially interlocked association with a complementary set of clutch teeth 26 on the inside of a gear 27 which is secured to the shaft 13, whereupon the shaft 23 will be connected with the driven shaft 13 for movement as a unit with the latter. When the collar 24 is shifted forwardly, from the neutral position shown in Fig. 1, a gear 28 which is formed on the periphery of the collar will move into mesh with a gear 29 on a countershaft 30. As the gear 29 is in mesh at all times with a gear 31 on a second countershaft 32, and another gear 33 on the countershaft 32 is in mesh at all times with the previously mentioned gear 27 on the driven shaft 13, a reverse drive connection between the shafts 23 and 13 will thereupon be established.

The collar 24 is adapted to be moved either rearwardly or forwardly from its neutral position by a shifting fork 34, which fork is secured to a rock shaft 35 and is connected by suitable linkage (not shown) to a conveniently located hand or foot control lever.

The liquid system within the transmission acts between the driving shaft 13 and the intermediate shaft 23, which latter shaft when clutched to the driven shaft 13 by the collar 24 may be considered as a part of the driven shaft. The liquid used, which is preferably a light oil, circulates through passages which are formed between curved blades on three inter-nested turbine wheels 36, 37 and 38. The wheel 36, which is composed of an annular series of blades 39, is the centrifugal impeller of the assembly and is attached rigidly to the rear end of the driving shaft 18. The second wheel 37, which is provided with four separate but rigidly associated series of blades 40, 41, 42 and 43, is attached to the front end of the shaft 23. The third wheel 38, which is provided with three separate but rigidly associated series of blades 44, 45 and 46, fits about both of the other wheels 36 and 37, in the form of an inwardly opening annular housing. The wheel 38 is attached at its front edge to a short sleeve 47 which is journaled on the shaft 18 in bearings 48, and is attached at its rear edge to another sleeve 49 which is journaled on the shaft 23 in bearings 50. The sleeve 47 is also rotatably supported by a web 51 of the casing 10, in bearings 52, while the sleeve 49 is similarly supported by another web 53 of the casing, in bearings 54.

The wheel 38 is free to rotate in the same direction as the wheels 36 and 37 but is held against rotation in the opposite direction by means of a one-way overrunning brake mechanism 55 which is operatively associated with the rear mounting sleeve 49 of the wheel 38. The brake mechanism 55 is composed of a ring 56 which is splined to the sleeve 49, an encircling ring 57 which is fastened to the web 53 of the casing, and a series of wedging rollers 58 between the rings 56 and 57. The rollers 58 are positioned in pockets 59 (see Fig. 6) which are separated by radial projections on the ring 56 and are formed between outwardly spiraling surfaces 60 on the outer periphery of the ring 56 and the inner cylindrical surface 61 of the ring 57. The rollers 58, which are pressed in the directions in which such surfaces converge by spring-actuated follower blocks 62, serve to prevent the ring 56 from turning backwardly while permitting it to turn forwardly with complete freedom of movement.

The blades of the turbine wheels 36, 37 and 38 are so shaped and arranged relative to each other as to cause the liquid in the system to circulate rapidly through the passages between such blades when the driving shaft 18, which carries the wheel 36, is rotated above an idling speed. The blades cause the liquid to discharge outwardly at high velocity from the passages present between the rapidly revolving blades 39 of the driving wheel 36, first against the first series of blades 40 of the driven wheel 37, then against the first series of re-directing blades 44 of the stationary reaction wheel 38, then against the second series of blades 41 of the driven wheel, then against the second series of blades 45 of the reaction wheel, then against the third series of blades 42 of the driven wheel, then against the third series of blades 46 of the reaction wheel, then against the fourth series of blades 43 of the driven wheel, and from there back again into the inner ends of the passages between the blades 39 in the driving wheel, where the circuit is completed. The edges of the blades in each series are formed to fit complementarily with the edges of the blades in adjacent series, with only enough clearance therebetween to prevent friction. The liquid is kept within the system by the application of antifriction sealing means of any suitable description. The manner in which the liquid acts against the four series of blades 40, 41, 42 and 43 of the driven wheel and is re-directed intermediate those series by the three series of blades 44, 45 and 46 of the stationary reaction wheel, is shown schematically in Fig. 2, in which view a centrifugal type pump is used to represent the action produced by the blades 39 of the driving wheel. Other hydraulic converters of this same general character are illustrated and described in Patent No. 1,199,359.

When the driving wheel 36 is rotating slowly— at what would correspond for instance to an idling speed of the motor—the circulation of the liquid in the system defined by the turbine wheels 36, 37 and 38 will be so slow as to have no appreciable effect on the driven wheel 37, but when the driving wheel 36 is speeded up the resulting velocity of the rapidly circulated fluid will be converted into torque against the driven wheel 37 and will rotate the latter under a substantial multiplication of torque.

After the liquid system has brought the driven shaft 13 up to a speed where a direct drive from the shaft 18 can properly be undertaken, a slight deceleration of the driving shaft, produced by a momentary let-up of the pressure on the accelerator pedal of the motor, will result in the driven shaft being coupled automatically to the driving shaft in a positive one-to-one drive. This is accomplished with a special clutch mechanism 63 which is located at the front end of the driven shaft 13 in a recess at the center of the rear face of the fly wheel 15. The clutch mechanism 63, which is fully explained in my copending application Serial No. 729,795, includes a collar 64 which is shiftable forwardly and rearwardly on a sleeve 65, which sleeve is in turn fastened to the front end of the shaft 13. The collar 64, although movable axially, is locked against any turning movement on the sleeve, and is provided at its rear end with a set of clutch teeth 66 for coaction with a complementary set of clutch teeth 67 on the front end of the previously described collar 20 on the driving shaft 18. The opposed faces of the clutch teeth 66 and 67 are angularly disposed with respect to their planes of rotation (see Fig. 5), which shaping serves to keep the teeth from moving into clutched engagement with each other until such time as the speed of the driving shaft 18 has been reduced to a speed which roughly approximates that of the driven shaft 13.

The collar 64 of this clutch mechanism is caused to shift rearwardly by the outward movement of a number of weights 68 which are pivoted at 69 to an anchor plate 70 and are provided with inwardly extending lugs 71 for engagement with a ring 72. The ring 72 acts against one end of a coil spring 73 and the other end of the spring in turn acts resiliently under the pressure of the ring against a flange 74 on the rear end of the collar 64. When the driven shaft 13 has been accelerated by the liquid system to a point where it is rotating above a certain minimum speed the weights 68 will be thrown out by centrifugal force and the spring 73 will be compressed, thereby forcing the angular faces of the clutch teeth 66 against the angular faces of the clutch teeth 67. As long as the driving shaft 18 rotates at a much greater speed than the driven shaft 13 the clutch teeth 67 will merely ride over the clutch teeth 66 and will not permit the latter to move into meshed association therewith, but as soon as any appreciable deceleration of the driving shaft 18 takes place the teeth 66 will slip in between the teeth 67 under the action of the then compressed spring and a positive one-to-one drive will be established through the clutch mechanism from the driving shaft to the driven shaft.
The action of the clutch mechanism 63 is clearly illustrated in Fig. 3, wherein the weights 68 are shown as thrown out, the spring 73 as compressed, and the teeth 67 as repelling in meshed association with the teeth 66 prior to the latter being permitted to move into mesh with the teeth 67 upon a deceleration of the driving shaft 18. In dotted lines in the same view the clutch teeth are shown as fully meshed.

After the previously described direct drive connection has once been established between the driving and driven shafts, it will continue until the speed of rotation of both shafts has fallen below a predetermined minimum, at which time the centrifugal force acting on the weights 68 will become insufficient to maintain the same in their outwardly thrown positions and they will move inwardly, allowing the clutch teeth 66 to be moved out of mesh with the teeth 67 by the expansive action of a number of compressed coil springs 75 (see Figs. 3 and 4) mounted on studs 76 carried by the plate 70.

The springs 75 serve as return springs for the weights 68 and the collar 64. They are mounted on the studs 76, and the studs 76 are riveted to the plate 70. The ring 72 is provided at intervals with radially extending ears which are apertured in order to receive the studs 76. The springs 75 are located between these ears and washers 75', which washers are held under definite tension by means of nuts 76' threaded on the ends of the studs. The outer portion of the ring 72 transfers the pressure of the springs 75 to the weights 68 by pressing against the inwardly extending lugs 71. These springs also control the rearward movement of the collar 64 by exerting a pressure on it through an abutment in the form of a snap ring 64'.

This positive connection between the driving and driven shafts can also be terminated at any time, regardless of the speed of rotation of the shafts, by means of a ring 77 which is mounted on the collar 20 in encompassing relation to the teeth 67 and in opposition to the outer periphery of the flange 74. The ring 77 is connected to an annular stamping 78 by a number of thrust pins 79 and is normally maintained in a retracted position by a compressed spring 80 which acts against the stamping 78. The stamping 78, with the ring 77, may be shifted forwardly on the collar 20 against the action of the spring 80 by means of a fork 81, which fork is secured to a rock shaft 82 and is connected by suitable linkage (not shown) to a conveniently located hand or foot control lever.

Whenever the liquid system is called into play to transmit power from the driving shaft 18 to the driven shaft 13 under a multiplication of torque, the reaction wheel 38, which would rotate backwardly were it not for the one-way brake 55, will stand still and not rotate forwardly with the driving and driven shafts 36 and 37. But as soon as the driven shaft 13 is coupled up with the driving shaft 18 by the clutch mechanism 63 in a direct drive ratio the driving and driven wheels 36 and 37 will turn forwardly together at the same speed and the reaction wheel 38 will move forwardly with them, thereby eliminating internal resistance in the liquid system.

The operation of the transmission is as follows:

When a forward drive is desired the collar 24 is shifted manually from its neutral position into its rearmost position, in which latter position the shaft 23 is locked to the driven shaft 13. To get under way it is merely necessary to accelerate the motor, whereupon the velocity of the rapidly circulating liquid in the system will turn the driven shaft 13 from the driving shaft 18 under a substantial multiplication of torque. As soon as the driven shaft 13 has attained a speed where a direct drive can advantageously be undertaken, the motor may be momentarily decelerated, whereupon the driven shaft 13 will be automatically coupled up with the driving shaft 18 in a positive one-to-one drive.

After this direct drive has been established it may be discontinued at any time by shifting the throw-out ring 77 forwardly, whereupon the drive will again take place through the liquid system under a multiplication of torque. Or the direct drive connection will be discontinued automatically when the speed of the driving and driven shafts falls below some predetermined minimum, by inward movement of the weights 68 and a resulting disengagement of the clutch mechanism 63.

When a reverse drive is desired the collar 24 is shifted from its neutral position into its foremost position, in which latter position the shaft 23 will turn the shaft 13 backwardly through the gear train 28, 29, 31, 33 and 27. Speeding up of the motor will then effect a reverse drive through the transmission under a multiplication of torque.

When the motor is brought down to an idling speed the liquid system will permit the transmission to run free, with the result that the motor will not stall from overload and the collar 24 need not be shifted into its neutral position in order to allow the driven shaft 13 to come to rest.

An overrunning clutch 83 may be provided between the fly wheel 15 and the front end of the shaft 13 for the purpose of causing the motor to be turned over when the vehicle is pushed or towed. This overrunning clutch will of course run free at all other times.

The improved transmission which forms the subject matter of the present invention has a wide range of application but is particularly well suited for use in vehicles because of its flexibility and its quietness and smoothness of operation.

I claim:

1. In a variable speed transmission, the combination, with a driving shaft, and a driven shaft, of a hydraulic torque converter having driving and driven turbine wheels which are connected respectively with the driving and driven shafts for producing a multiplication of torque therebetween, a clutch for connecting the driving and driven shafts together in a one-to-one drive, means for automatically throwing in the clutch upon a momentary reduction in the speed of rotation of the driving shaft after the latter has acted through the torque converter to bring the driven shaft up to a speed where it can be handled by the driving shaft in a one-to-one drive, means for automatically releasing the clutch when the speed of rotation of both shafts drops below a predetermined minimum, and other manually operable means for releasing the clutch irrespective of the speed of rotation of the shafts.

2. In combination, a torque converter comprising fluid-connected driving and driven members, means biased in response to the speed of one of said members for mechanically connecting both of said members together, and manually operable means to overrule said first mentioned means and disconnect said mechanical connection at the option and under the control of the operator, whereby to reestablish at will the fluid-connected drive between the driving and driven members.

3. In combination, a torque converter comprising fluid-connected driving and driven members, automatic means biased in response to the speed of rotation of the driven member for mechanically connecting both of said members together, and manually operable means to overrule said automatic means and disconnect said mechanical connection at the option and under the control of the operator, irrespective of the speed of rotation of the driven member, whereby to reestablish at will the fluid-connected drive between the driving and driven members.

4. In combination, a torque converter comprising fluid-connected driving and driven members, automatic means biased in response to the speed of rotation of the driven member for mechanically connecting both of said members together, means for preventing said mechanical connection until the speed of the driven member is substantially equal to the speed of the driving member, and manually operable means to overrule said automatic means and disconnect said mechanical connection at the option and under the control of the operator, irrespective of the speed of rotation of the driven member, whereby to reestablish at will the fluid-connected drive between the driving and driven members.

5. In a variable speed transmission, the combination, with a driving shaft, and a driven shaft, of a hydraulic torque converter having driving and driven turbine wheels which are connected respectively with the driving and driven shafts for producing a multiplication of torque therebetween, a clutch for connecting the driving and driven shafts together in a one-to-one drive, means for automatically throwing in the clutch upon a momentary reduction in the speed of rotation of the driving shaft after the latter has acted through the torque converter to bring the driven shaft up to a speed where it can be handled by the driving shaft in a one-to-one drive, and manually operable means for releasing the clutch irrespective of the speed of rotation of the shafts.

OSCAR H. BANKER.